United States Patent [19]

Schaffers et al.

[11] Patent Number: 5,677,921
[45] Date of Patent: Oct. 14, 1997

[54] YTTERBIUM-DOPED BORATE FLUORIDE LASER CRYSTALS AND LASERS

[75] Inventors: Kathleen I. Schaffers, Pleasanton; Laura D. DeLoach, Manteca; Stephen A. Payne, Castro Valley, all of Calif.; Douglas A. Keszler, Corvallis, Okla.

[73] Assignee: The Regents of the University of California, Oakland, Calif.

[21] Appl. No.: 409,236

[22] Filed: Mar. 24, 1995

[51] Int. Cl.[6] .................................................. H01S 3/16
[52] U.S. Cl. ................... 372/41; 372/22; 372/18; 372/10
[58] Field of Search .................... 372/40, 41, 69, 372/70, 22, 18, 60

[56] References Cited

U.S. PATENT DOCUMENTS

| 4,044,315 | 8/1977 | Snitzer | 372/40 |
|---|---|---|---|
| 5,027,361 | 6/1991 | Kozlovsky et al. | 372/22 |
| 5,084,879 | 1/1992 | Suzuki et al. | 372/22 |
| 5,123,026 | 6/1992 | Fan et al. | 372/22 |
| 5,381,428 | 1/1995 | McMahon et al. | 372/22 |

*Primary Examiner*—Leon Scott, Jr.
*Attorney, Agent, or Firm*—Henry P. Sartorio

[57] ABSTRACT

A new class of solid state laser crystals and lasers are formed from Yb-doped borate fluoride host crystals. The general formula for the host crystals is MM'(BO$_3$)F, where M, M' are monovalent, divalent aria trivalent metal cations. A particular embodiment of the invention is Yb-doped BaCaBO$_3$F (Yb:BCBF). BCBF and some of the related derivative crystals are capable of nonlinear frequency conversion, whereby the fundamental of the laser is converted to a longer or shorter wavelength. In this way, these new crystals can simultaneously serve as self-frequency doubling crystals and laser materials within the laser resonator.

14 Claims, 3 Drawing Sheets

YTTERBIUM-DOPED BORATE FLUORIDE LASER CRYSTALS AND LASERS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The invention related generally to solid state lasers, particularly to solid state laser materials, and more particularly to laser materials capable of nonlinear self-frequency conversion.

2. Description of Related Art

Rare earth-doped crystals and glasses have been known to be useful laser materials for several decades, since Johnson et al. showed that Er and Tm-doped crystals lased in the infrared [L. F. Johnson, "Optical maser characteristics of rare earth ions in crystals," J. Appl. Phys. 34, 897 (1963)]. Nd-doped materials, however, turned out to be the most common and effective laser materials. Snitzer demonstrated laser action for Nd-doped silicate glass [E. Snitzer, "Optical maser action in barium crown glass," Physical Review Letters 7, 444 (1961)]; and $Nd:Y_3Al_5O_{12}$ (Nd:YAG) was identified by Geussic et al. [T. Kushida, H. M. Marcos and I. E. Geussic, "Laser transition cross section and fluorescence branching ratio for $Nd^{3+}$ in yttrium aluminum garnet," Physical Review 167, 289 (1968)]. Nd:YAG eventually emerged as the most common solid state laser system. Other rare earth ions in YAG such as Yb:YAG were also recognized to be capable of laser action many years ago [for example, A. R. Reinberg et al., "GaAs:Si LED pumped Yb-doped YAG laser," Applied Physics Letters 19, 11 (1971)], but have not been engineered into practical systems until recently. Yb:YAG proved to be far more practical when pumped by laser diode technology, instead of by flashlamps [W. F. Krupke and L. L. Chase, "Ground-state depleted solid state lasers: Principles, characteristics, scaling," Optical and Quantum Electronics 22, S1 (1990); P. Lacovara, H. K. Choi, C. A. Wang, R. L. Aggarwal, and T. Y. Fan, "Room-temperature diode-pumped Yb:YAG laser," Optics Letters 16, 1089 (1991)]. Several other types of Yb-doped materials were also found to be useful in laser diode-pumped laser systems, including Yb-doped $SiO_2$ (silica) [D. C. Hanna, R. M. Percival, I. R. Perry, R. G. Smart, P. I. Suni, and A. C. Tropper, "A ytterbium monomode fiber laser," Journal of Modern Optics 37, 517 (1990)] and the Yb-doped apatites [W. F. Krupke et al., U.S. Pat. No. 5,280,492; S. A. Payne et al., U.S. Pat. No. 5,341,389]. Both Yb- and Nd-based laser materials generally operated in the wavelength range of 1.03 to 1.07 µm.

Although rare earth lasers such as Nd:YAG produce a fixed output wavelength (1.064 µm in this case), nonlinear frequency-conversion crystals can be employed to shift the output to other wavelengths. For example, so-called doubling crystals serve to double the frequency (i.e. halve the wavelength); for Nd:YAG the resulting wavelength then becomes 0.532 µm. In order for doubling (or any nonlinear conversion process) to be effective, the optical axes of the nonlinear crystal must be precisely oriented at the phase-matching angle, determined with respect to the beam propagation and polarization directions. The nonlinear wavelength conversion process can be more generally represented as the two input frequencies $f_1$ and $f_2$, with output produced at $f_1+f_2$ or $f_1-f_2$. For these examples the nonlinear crystal is located outside of the Nd:YAG laser cavity, such that the crystal intercepts the output beam. It is also possible to place the nonlinear crystal within the cavity mirrors (intracavity) of the laser system (Nd:YAG or otherwise). This arrangement poses some advantages since frequency doubling scales as the square of the light intensity, and the intracavity light intensity is usually much higher than the external intensity. In principle, these arrangements can be used for optical parametric oscillation as well, where the fundamental frequency of the laser ($f_1$) becomes divided into two lower frequency beams ($f_2+f_3$), such that $f_1=f_2+f_3$.

The use of intracavity doubling has been previously recognized to be a potentially effective means of converting the laser output to shorter wavelengths. For example, Gavrilovic et al. [U.S. Pat. No. 5,295,146] teaches that microlasers can be constructed from Nd-doped $YVO_4$, $Y_3Al_5O_{12}$ or $La_2O_2S$, and that a nonlinear crystal comprising a frequency-doubler can also be included in the cavity. Similarly, Okazaki et al. [U.S. Pat. No. 5,124,999] indicates that a rare earth-doped crystal pumped by a semiconductor laser can be configured to oscillate with an organic nonlinear optical material in the cavity in order to generate the frequency doubled output with respect to the fundamental frequency. The organic crystals are suggested to be selected from PRA, MNA, NPP, NPAN, MAP and m-NA. Fan and Lacovara [U.S. Pat. No. 5,123,026] note that a laser diode-pumped Yb:YAG laser can be arranged with a frequency-doubling crystal in the cavity to generate light near 0.515 µm. They noticed that Yb-doped materials do not absorb at the doubled frequency while Nd-doped materials inherently do, posing a special advantage for the Yb-based laser materials.

A related approach to intracavity frequency conversion schemes is one in which the laser material serves both as the gain medium and the doubling crystal. The main example of this situation is found for $YAl_3(BO_3)_4$, a crystal that can be doped with Nd ions (referred to as NYAB). NYAB lases near the fundamental wavelength of 1.06 µm and then self-doubles the light beam to generate output at 0.53 µm. [Amano, U.S. Pat. No. 5,222,088; Qui et al., U.S. Pat. No. 5,058,118]. Other less well-developed materials are expected to be able to perform in a similar manner, such as $Ca_3(VO_4)_3$ [Sleight et al., U.S. Pat. No. 5,202,891] and $LaBGeO_5$ [A. A. Kaminski et al., "Pure and $Nd^{3+}$-, $Pr^{3+}$-ion doped trigonal acentric $LaBGeO_5$ single crystals," Phys. Stat. Sol. A 125, 671 (1991)].

There are numerous examples of nonlinear frequency conversion crystals, the most common of which are KDP, BBO, LBO, $LiNbO_3$, $KNbO_3$, KTT, etc. A recently discovered nonlinear crystal is $BaCaBO_3F$ [D. A. Keszler et al., "New borate structures for NLO applications," in New Materials for Advanced Solid State Lasers, eds. Chai et al. (Materials Research Society, Pittsburg, 1994) p. 15].

SUMMARY OF THE INVENTION

Accordingly, it is an object of the invention to provide a new class of ytterbium-doped solid state laser crystals, having the general formula $MM'BO_3F$, where M, M' are monovalent, divalent and trivalent metal ions. Said laser crystals may be employed in solid state lasers serving as oscillators or amplifiers.

Another object of the invention is to provide Yb-doped crystals having the $MM'BO_3F$ formula which can also nonlinearly convert the fundamental output of the laser to longer or shorter wavelengths.

3

According to the invention, the Yb rare earth ion exhibits worthwhile laser properties in crystals having the formula MM'BO$_3$F where M and M' can be selected from Mg$^{2+}$, Ca$^{2+}$, Sr$^{2+}$, Ba$^{2+}$, Zn$^{2+}$, Cd$^{2+}$ or Pb$^{2+}$, or M can be selected from Li$^+$, Na$^+$ K$^+$ or Rb$^+$ and M' from Al$^{3+}$, Ga$^{3+}$, Sc$^{3+}$, Y$^{3+}$, La$^{3+}$, Gd$^{3+}$, Lu$^{3+}$ or other rare earth ion. A preferred crystal is BaCaBO$_3$F. Yb-doped BaCaBO$_3$F or other MM'BO$_3$F can be employed as a self-doubling laser crystal, by both generating and nonlinearly converting the laser light.

DETAILED DESCRIPTION OF THE INVENTION

The invention is a solid state laser material and laser apparatus comprised of Yb-doped crystal hosts, said hosts having the general formula MM'BO$_3$F, where M and M' can be selected from the divalent cations Mg$^{2+}$, Ca$^{2+}$, Sr$^{2+}$, Ba$^{2+}$, Zn$^{2+}$, Cd$^{2+}$ or Pb$^{2+}$, or from a combination of monovalent and trivalent ions including M=Li$^+$, Na$^+$, K$^+$, Rb$^+$ and M'=Al$^{3+}$, Ga$^{3+}$, Sc$^{3+}$, Y$^{3+}$, La$^{3+}$, Gd$^{3+}$, Lu$^{3+}$, or other rare earth ion. A particular embodiment is Yb-doped BaCaBO$_3$F (Yb:BCBF). BCBF, and other crystals having the MM'BO$_3$F formula are also capable of nonlinearly converting the frequency of the laser light to longer or shorter wavelengths.

Figure 1A:
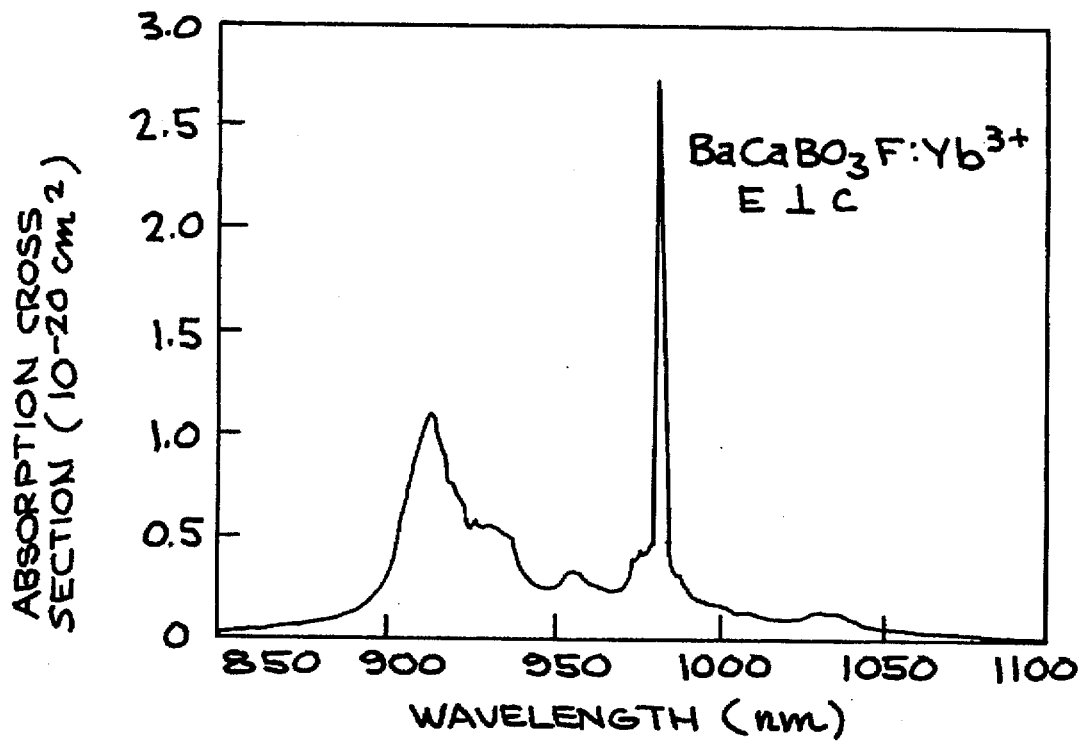
FIGS. 1A, 1B show the room temperature absorption spectra of Yb-doped BaCaBO$_3$F taken with light polarized perpendicular to (E⊥c), and along (E∥c), the c axis of the crystal.
Figure 1B:
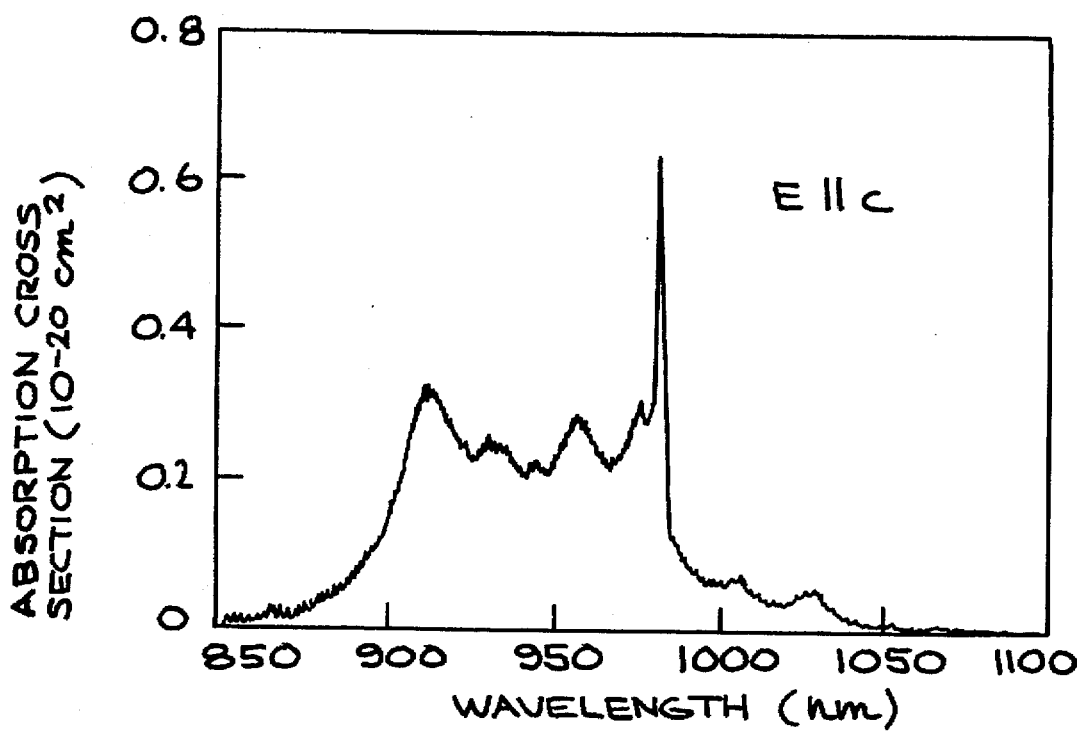

The absorption spectra of the Yb:BCBF crystal appears in FIGS. 1A,B. Two spectra are shown, since BCBF is a uniaxial crystal and the spectra corresponding to the electric field of the light wave being parallel and perpendicular (E∥c and E⊥c, respectively) to the optic axis of the crystal are required to fully characterize the absorption properties. It is apparent from the data in FIGS. 1A,B that the pump laser source is optimally set at 0.912 μm with E∥c.

Figure 2A:
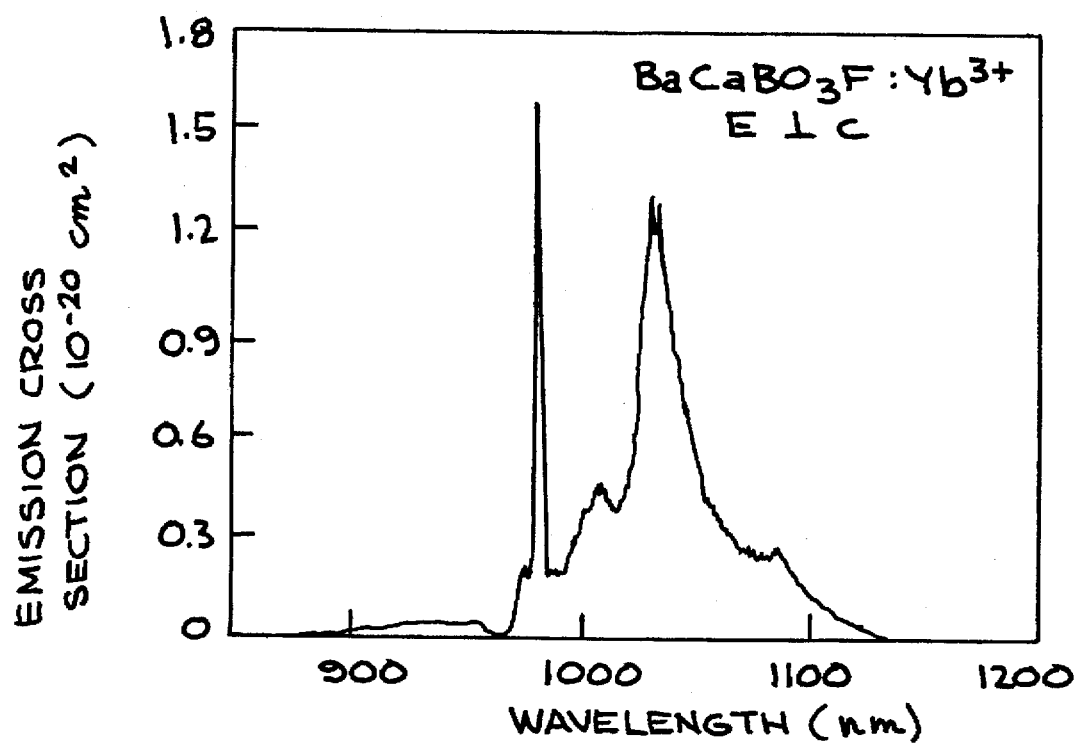
FIGS. 2A, 2B depict the room temperature emission spectra of Yb-doped BaCaBO$_3$F taken with light polarized as E⊥c and E∥c.
Figure 2B:
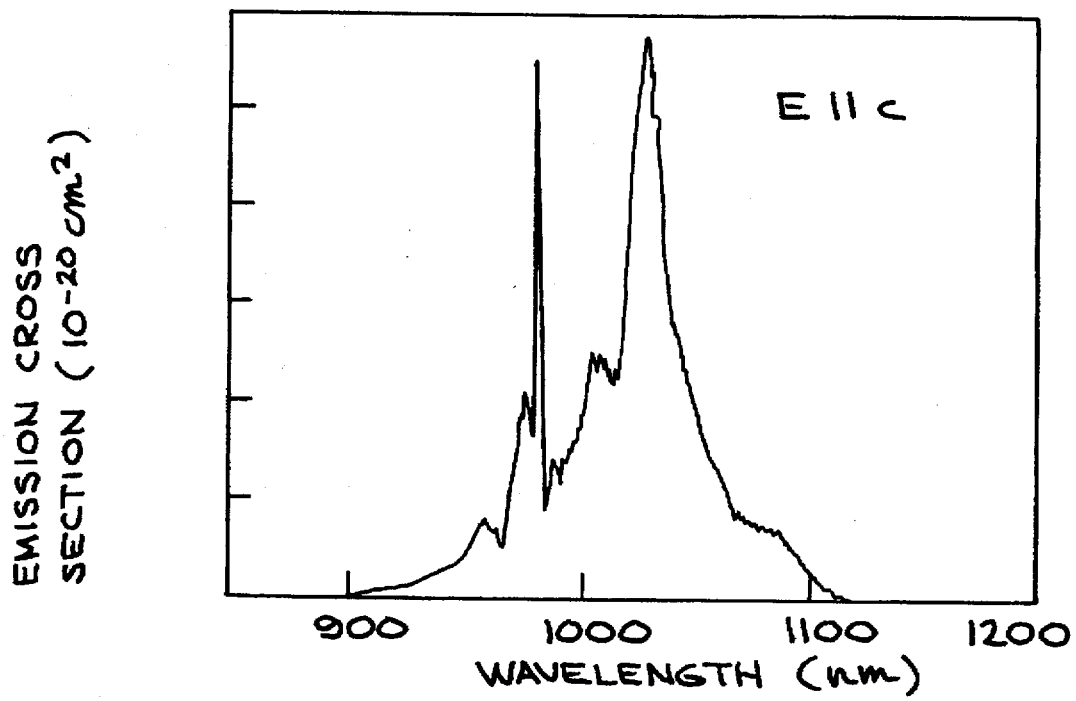

Similarly, the polarized emission spectra of Yb:BCBF are plotted in FIGS. 2A,B. The peak emission (that is free of most absorption) occurs at 1.034 μm. On the basis of the data in FIGS. 2A,B, Yb:BCBF is expected to lase with E∥c at 1.03 μm.

Figure 3:
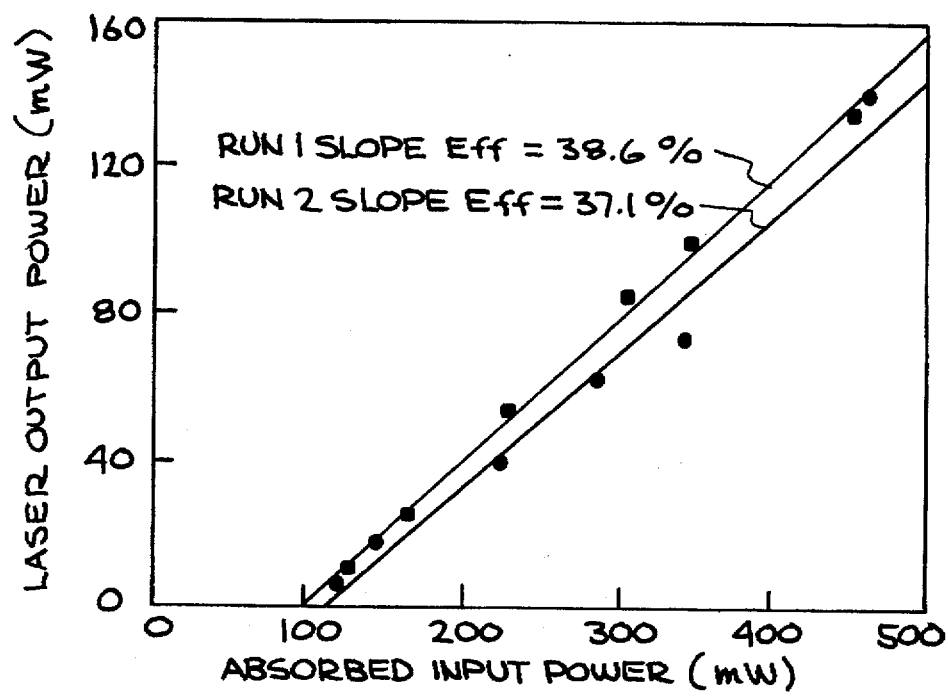
FIG. 3 is a plot of the 1.03 μm output power generated from an Yb:BaCaBO$_3$F laser oscillator pumped at 0.912 μm with a laser source.

The Yb:BCBF crystal has been successfully demonstrated to lase using a straightforward laser cavity configuration, in which the Yb:BCBF crystal was placed symmetrically between two aligned mirrors. One mirror was selected to transmit the pump light at 0.912 μm and be highly-reflecting at the peak emission wavelength of 1.034 μm, while the other cavity mirror (i.e., the output coupler) transmits about 3% at 1.034 μm. A commercial Ti:sapphire laser operating at 0.912 μm was employed as the pump source. The results of the laser demonstration are displayed in FIG. 3, where it is seen that the conversion efficiency for 1.03 μm output power compared to the absorbed 0.912 μm pump power, is about 38%. This experimental result proves that Yb:BCBF is a promising new laser material. It furthermore broadly suggests that the class of crystals comprised of Yb-doped MM'BO$_3$F compounds are useful lasers as well.

4

Another special feature of BaCaBO$_3$F is the expectation, based on its acentric crystal structure, that it should be capable of nonlinear frequency conversion. To test this possibility, a powdered specimen of BCBF was placed in the path of the 1.064 μm output of a Nd:YAG laser; nonlinear conversion of the infrared beam to the green 0.532 μm wavelength was observed. By carefully comparing the relative response of BCBF with the well-known KDP crystal powder, it was deduced that the effective d-coefficient of BCBF was $d_{eff}$=0.26 pm/V, compared to 0.39 for KDP. The linear refractive indices were also measured as a function of wavelength. From these measurements it was deduced that it is feasible to phasematch BCBF at 37.4° with respect to the c axis, thereby suggesting that frequency doubling can be accomplished efficiently with this crystal. It may be concluded that Yb:BCBF is capable of both laser generation and frequency doubling within the single optical element.

Figure 4:
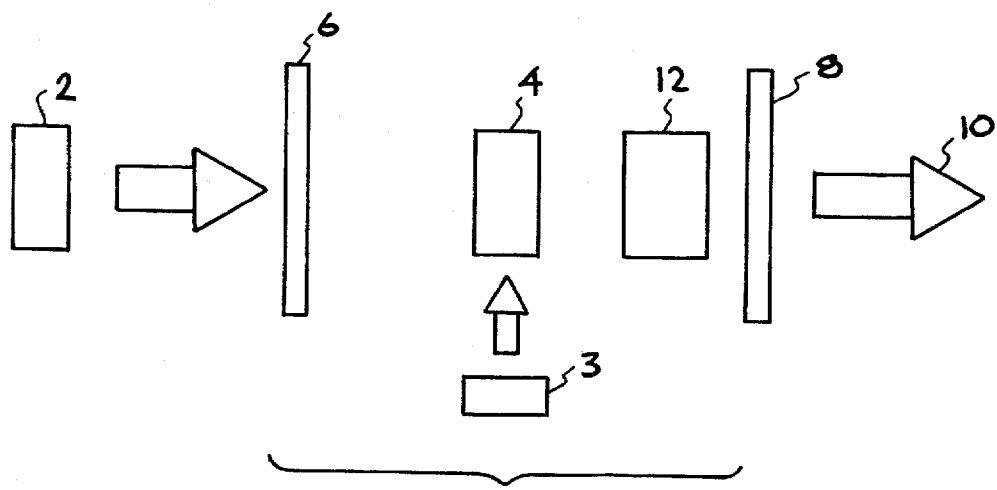
FIG. 4 shows a generic laser apparatus in which the new class of laser materials can be incorporated.

The laser apparatus into which the new laser materials may be incorporated is illustrated schematically in FIG. 4. In this particular embodiment, the pump source (2) can be a laser diode, a laser diode array, or another laser arranged to longitudinally pump the gain medium (4) through the resonator mirror (6). The output coupling mirror (8) is aligned to form the laser resonator. The output beam (10) is generated by pumping the gain medium with the pump source (2). Alternative embodiments of the laser apparatus entail pumping transverse to the optic axis of the cavity (3) and the use of incoherent sources (e.g., flashlamps or LEDs) instead of laser sources. The laser apparatus may be configured to generate output light (10) near the fundamental at 1.03 μm, or be frequency-doubled to near 0.517 μm by virtue of the nonlinear frequency-conversion properties of the BCBF crystal; this may also be accomplished by the use of a separate frequency-conversion crystal. If the BCBF crystal itself is used, it will be configured (cut at the proper angles) to produce frequency conversion. The Yb:BCBF crystal may furthermore be employed as an optical parametric oscillator to generate light at wavelengths longer than the 1.03 μm fundamental output. Additional optics (12) may be included in the cavity in order to Q-switch, modelock, wavelength tune, line narrow, or otherwise manipulate the properties of the laser beam that is generated by the apparatus. The gain medium can be utilized as a laser amplifier (instead of an oscillator), wherein an injected beam is enhanced in energy or power.

While particular methods, materials, parameters, etc. have been described and/or illustrated, such is not intended to limit the scope of this invention. Modifications and changes will become apparent and it is intended that the scope of the invention be limited only by the scope of the appended claims.

We claim:

1. A laser gain medium comprising an ytterbium-doped crystal, said crystal having the formula MM'(BO$_3$)F, wherein:

M and M' are divalent cations selected from Mg$^{2+}$, Ca$^{2+}$, Sr$^{2+}$, Ba$^{2+}$, Zn$^{2+}$, Cd$^{2+}$ or Pb$^{2+}$, or a combination of monovalent and trivalent cations selected from M=Li$^+$, Na$^+$, K$^+$, or Rb$^+$ and M'=Al$^{3+}$, Ga$^{3+}$, Sc$^{3+}$, Y$^{3+}$, La$^{3+}$, Gd$^{3+}$, Lu$^{3+}$ or other rare earth ion.

2. The laser gain medium of claim 1, comprising Yb-doped BaCa(BO$_3$)F.

3. A solid state laser, comprising:

a laser gain medium comprising an ytterbium-doped crystal, said crystal having the formula MM'(BO$_3$)F, wherein:

M and M' are divalent cations selected from Mg$^{2+}$, Ca$^{2+}$, Sr$^{2+}$, Ba$^{2+}$, Zn$^{2+}$, Cd$^{2+}$ or Pb$^{2+}$, or a combination of monovalent and trivalent cations selected from $M=Li^+$, $Na^+$, $K^+$, or $Rb^+$ and $M'=Al^{3+}$, $Ga^{3+}$, $Sc^{3+}$, $Y^{3+}$, $La^{3+}$, $Gd^{3+}$, $Lu^{3+}$ or other rare earth ion;

excitation means coupled with the gain medium for pumping the gain medium;

cavity forming means surrounding the gain medium to form a resonant laser cavity;

energy extraction means in the cavity forming means to remove laser energy from the cavity.

4. The solid state laser of claim 3, wherein said gain medium is configured to also serve as a nonlinear frequency conversion crystal.

5. The solid state laser of claim 4 wherein the nonlinear frequency-conversion crystal is configured to double the frequency of the laser light.

6. The solid state laser of claim 3, wherein the excitation means is a laser diode.

7. The solid state laser of claim 3, further including a means of modelocking said laser positioned in the resonant laser cavity.

8. The solid state laser of claim 3 wherein the gain medium is Yb-doped $BaCa(BO_3)F$.

9. The solid state laser of claim 8, wherein said gain medium is configured to also serve as a nonlinear frequency conversion crystal, in order to convert the fundamental light output of the laser light to a longer or shorter wavelength.

10. The solid state laser of claim 9, wherein the nonlinear frequency-conversion crystal is configured to double the frequency of the laser light.

11. The solid state laser of claim 8, wherein the excitation means is a laser diode.

12. The solid state laser of claim 8, further including a means of modelocking said laser positioned in the resonant laser cavity.

13. The solid state laser of claim 8 further including a means of Q-switching said laser positioned in the resonant laser cavity.

14. The solid state laser of claim 3 further including a means of Q-switching said laser positioned in the resonant laser cavity.

* * * * *